(12) United States Patent
Davidow et al.

(10) Patent No.: US 9,828,739 B2
(45) Date of Patent: Nov. 28, 2017

(54) IN-LINE BATTERED COMPOSITE FOUNDATIONS

(71) Applicant: Crux Subsurface, Inc., Spokane Valley, WA (US)

(72) Inventors: Steven Austin Davidow, Greenacres, WA (US); Nickolas G. Salisbury, Spokane Valley, WA (US)

(73) Assignee: Crux Subsurface, Inc., Spokane Valley, WA (US)

( * ) Notice: Subject to any disclaimer, the term of this patent is extended or adjusted under 35 U.S.C. 154(b) by 0 days.

(21) Appl. No.: 14/932,820

(22) Filed: Nov. 4, 2015

(65) Prior Publication Data

US 2017/0121926 A1 May 4, 2017

(51) Int. Cl.
| | |
|---|---|
| *E02D 5/34* | (2006.01) |
| *E02D 5/44* | (2006.01) |
| *E02D 5/38* | (2006.01) |
| *E02D 7/00* | (2006.01) |
| *E04H 12/34* | (2006.01) |

(52) U.S. Cl.
CPC ............... *E02D 5/38* (2013.01); *E02D 7/00* (2013.01); *E04H 12/34* (2013.01); *E02D 5/34* (2013.01); *E02D 5/44* (2013.01); *E02D 2250/0023* (2013.01); *E02D 2300/002* (2013.01); *E02D 2300/0029* (2013.01)

(58) Field of Classification Search
CPC .... E02D 5/30; E02D 5/34; E02D 5/44; E02D 5/50; E02D 5/54
USPC ....... 405/231–233, 237, 239, 244, 249, 256, 405/257
See application file for complete search history.

(56) References Cited

U.S. PATENT DOCUMENTS

| 1,486,594 A | 3/1924 | Malone |
| 1,746,848 A * | 2/1930 | Bates ..................... E02D 27/42 |
| | | 114/294 |

(Continued)

FOREIGN PATENT DOCUMENTS

| JP | 2003074056 | 3/2003 |
| JP | 2003074057 | 3/2003 |

(Continued)

OTHER PUBLICATIONS

Baker, "LRFD Design Example for Steel Girder Superstructure Bridge", Dec. 2003, pp#1-pp#648.

(Continued)

*Primary Examiner* — Sunil Singh
(74) *Attorney, Agent, or Firm* — Lee & Hayes, PLLC

(57) ABSTRACT

The disclosure describes, in part, battered composite piles arranged in-line with angled legs of a tower (e.g., lattice tower). The number of battered composite piles may be equal to the number of angled tower legs of the tower, and each of the battered composite piles may attach to a respective angled tower leg and may have batter angles at angles that match an angle of the angled legs of the tower. These battered composite piles are loaded predominantly axially rather than in shear and, thus, the piles may be designed to be much smaller in size while still meeting safety requirements. In addition, the piles may be installed in less time and at a lower cost than compression/lift and shear loaded foundations.

14 Claims, 5 Drawing Sheets

(56) References Cited

U.S. PATENT DOCUMENTS

| | | | |
|---|---|---|---|
| 2,608,830 A * | 9/1952 | Burrell | E02D 27/14 405/257 |
| 2,843,347 A | 7/1958 | King | |
| 2,916,233 A | 12/1959 | Ecker | |
| 3,328,969 A | 7/1967 | Murphy et al. | |
| 3,397,494 A | 8/1968 | Waring | |
| 3,427,871 A | 2/1969 | Handy et al. | |
| 3,590,930 A | 7/1971 | Gronfors | |
| 3,789,921 A | 2/1974 | DeChassy et al. | |
| 3,894,588 A | 7/1975 | Brill | |
| 3,946,570 A | 3/1976 | Freydier | |
| 3,946,601 A | 3/1976 | Yizhaki | |
| 3,992,831 A | 11/1976 | Bukovitz et al. | |
| 4,023,325 A | 5/1977 | Paverman | |
| 4,043,133 A | 8/1977 | Yegge | |
| 4,068,445 A | 1/1978 | Bobbitt | |
| 4,099,354 A | 7/1978 | DePirro | |
| 4,228,627 A * | 10/1980 | O'Neill | E02D 27/42 52/169.13 |
| 4,257,722 A | 3/1981 | Nakajima | |
| 4,293,242 A | 10/1981 | Merjan | |
| 4,339,899 A * | 7/1982 | Klenk | E02D 27/42 403/337 |
| 4,561,231 A * | 12/1985 | Hoyt | E02D 27/42 52/157 |
| 4,606,155 A | 8/1986 | Bukovitz et al. | |
| 4,640,118 A | 2/1987 | Kishida et al. | |
| 4,687,380 A | 8/1987 | Meek et al. | |
| 4,735,527 A | 4/1988 | Bullivant | |
| 4,966,498 A | 10/1990 | Blum | |
| 5,037,022 A | 8/1991 | Rossi | |
| 5,039,256 A | 8/1991 | Gagliano | |
| 5,060,435 A | 10/1991 | Bogdanow | |
| 5,213,169 A | 5/1993 | Heller | |
| 5,219,247 A | 6/1993 | Gemmi et al. | |
| 5,226,488 A | 7/1993 | Lessard et al. | |
| 5,256,004 A | 10/1993 | Gemmi et al. | |
| 5,531,544 A | 7/1996 | Willcox, II | |
| 5,577,857 A | 11/1996 | Miyasaka et al. | |
| 5,749,198 A | 5/1998 | Johnson | |
| 5,873,679 A | 2/1999 | Cusimano | |
| 5,878,540 A | 3/1999 | Morstein | |
| 5,908,268 A | 6/1999 | Yabuuchi | |
| 5,931,604 A | 8/1999 | Queen et al. | |
| 6,012,874 A | 1/2000 | Groneck et al. | |
| 6,026,627 A | 2/2000 | Moore | |
| 6,033,152 A | 3/2000 | Blum | |
| 6,332,303 B1 | 12/2001 | Saito | |
| 6,354,766 B1 | 3/2002 | Fox | |
| 6,574,893 B2 | 6/2003 | Mizutani | |
| 6,578,333 B1 | 6/2003 | Gagliano | |
| 6,659,691 B1 | 12/2003 | Berry | |
| 6,665,990 B1 | 12/2003 | Cody et al. | |
| 6,799,401 B1 | 10/2004 | Legler | |
| 6,801,814 B1 | 10/2004 | Wilson et al. | |
| 6,854,934 B2 | 2/2005 | Yamane et al. | |
| 6,877,710 B2 | 4/2005 | Miyahara et al. | |
| 7,073,980 B2 | 7/2006 | Merjan et al. | |
| 7,076,925 B2 | 7/2006 | Gagliano | |
| 7,326,003 B2 | 2/2008 | Gagliano | |
| 7,326,004 B2 | 2/2008 | Wissmann et al. | |
| 7,404,455 B2 | 7/2008 | Yue et al. | |
| 7,517,177 B2 | 4/2009 | Erdemgil | |
| 7,721,494 B2 | 5/2010 | Lee | |
| 8,109,057 B2 | 2/2012 | Stark | |
| 8,974,150 B2 | 3/2015 | Salisbury et al. | |
| 2003/0066251 A1 | 4/2003 | Cusimano | |
| 2003/0196393 A1 | 10/2003 | Bowman et al. | |
| 2004/0093218 A1 | 5/2004 | Bezar | |
| 2004/0093818 A1 | 5/2004 | Simmons | |
| 2005/0063789 A1 | 3/2005 | Gunther | |
| 2005/0117977 A1 | 6/2005 | Rasumussen | |
| 2007/0092341 A1 | 4/2007 | Schmertmann et al. | |
| 2007/0236272 A1 | 10/2007 | Min et al. | |
| 2007/0269272 A1 | 11/2007 | Kothnur et al. | |
| 2007/0269273 A1 | 11/2007 | Henderson | |
| 2008/0131211 A1 | 6/2008 | NeSmith et al. | |
| 2009/0003938 A1 | 1/2009 | Nishimori | |
| 2010/0031589 A1 | 2/2010 | Fernald et al. | |
| 2010/0038088 A1 | 2/2010 | Springett et al. | |
| 2011/0042142 A1 | 2/2011 | Edmonds et al. | |
| 2011/0061321 A1 | 3/2011 | Phuly | |
| 2012/0096778 A1 | 4/2012 | Bauletti | |
| 2012/0096786 A1 | 4/2012 | Salisbury et al. | |
| 2015/0139740 A1 | 5/2015 | Salisbury et al. | |

FOREIGN PATENT DOCUMENTS

| | | |
|---|---|---|
| JP | 2003082648 | 3/2003 |
| WO | WO93/19236 | 8/1993 |

OTHER PUBLICATIONS

ITCO Allied Engineering Co, "Types of Soil Borings", Oct. 5, 2008 (The Wayback Machine), <<http://www.itcoallied.com/id10.html>>, 1 pages.

Non-Final Office Action for U.S. Appl. No. 12/813,076, dated Oct. 2, 2012, Nickolas G. Salisbury et al., "Batter Angled Flange Composite Cap", 6 Pages.

Non-Final Office Action for U.S. Appl. No. 12/813,030, dated Oct. 4, 2012, Nickolas G. Salisbury et al., "Composite Cap", 6 pages.

Office Action for U.S. Appl. No. 12/797,945, dated Nov. 27, 2013, Nickolas G. Salisbury, "Micropile Foundation Matrix", 23 pages.

Non-Final Office Action for U.S. Appl. No. 12/797,887, dated Mar. 12, 2013, Kenneth R. Edmonds et al., "Spindrill", 10 pages.

Non-Final Office Action for U.S. Appl. No. 12/797,945, dated Mar. 6, 2013, Nickolas G. Salisbury et al., "Micropile Foundation Matrix", 22 pages.

Office action for U.S. Appl. No. 14/932,820, dated Apr. 14, 2017, Davidow et al., "In-Line Battered Composite Foundations", 18 pages.

Final Office Action for U.S. Appl. No. 12/813,076, dated May 28, 2013, Nickolas G. Salisbury et al., "Batter Angled Flange Composite Cap", 8 pages.

Final Office Action for U.S. Appl. No. 14/607,828, dated Jun. 19, 2015, Nickolas G. Salisbury, "Micropile Foundation Matrix", 5 pages.

Office action for U.S. Appl. No. 12/797,945, dated Jun. 24, 2014, Salisbury et al., "Micropile Foundation Matrix", 25 pages.

Non-Final Office Action for U.S. Appl. No. 12/797,887, dated Jul. 17, 2012, Kenneth R. Edmonds et al., "Spindrill", 13 pages.

Non-Final Office Action for U.S. Appl. No. 12/797,945, dated Jul. 20, 2012, Nickolas G. Salisbury et al., "Micropile Foundation Matrix", 23 pages.

* cited by examiner

IN-LINE BATTERED COMPOSITE FOUNDATIONS

BACKGROUND

Companies that operate within the geotechnical construction industry often engage in a variety of different excavation projects to install a variety of different structures. For instance, these companies may install foundations for a series of towers (e.g., lattice towers) that carry power lines or the like from one location to another. In some instances, the foundations used to support the towers are vertical shafts filled with concrete. Because the concrete shafts are arranged vertically, relative to the ground surface, these foundations are designed to handle high shear loads. While these companies have proven successful at installing vertical concrete shafts for towers, other more efficient and cost-effective techniques may exist.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
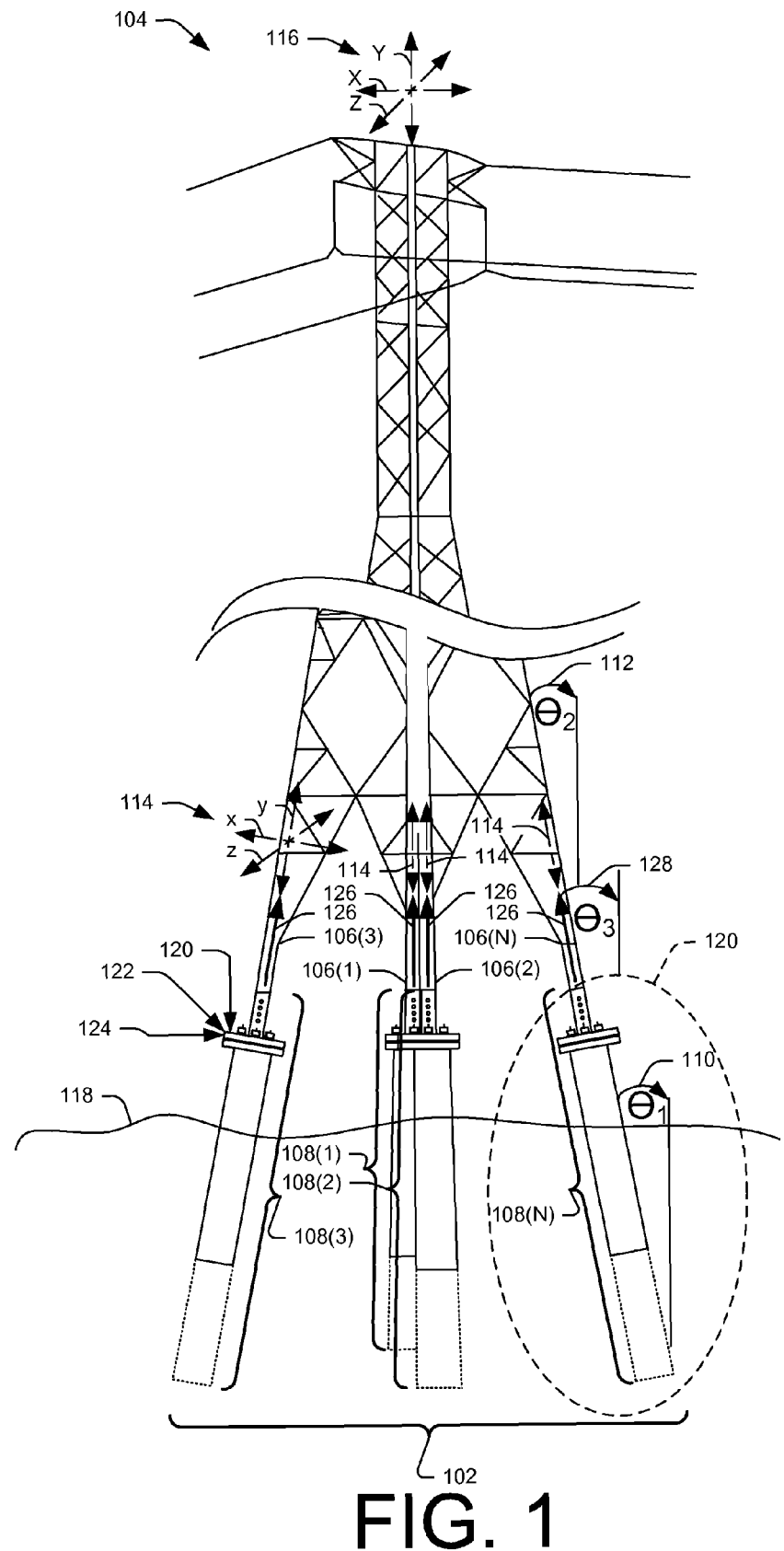
FIG. 1 illustrates an example array of battered composite piles attached to a tower.

The disclosure describes, in part, structures (e.g., foundations, footings, anchors, abutments, etc.), and methods for installing the structures at work sites. For instance, this disclosure describes battered composite piles having batter angles at angles that match an angle of angled legs of a tower (e.g., lattice tower) arranged to align radially with the center of the tower. For instance, if a set of angled legs of a tower is designed to include a particular angle, $\theta_L$, an array of battered composite piles may be similarly designed to include battered composite piles at an angle, $\theta_P$ that substantially matches the angle, $\theta_L$, of the angled legs of the tower. For instance, the angle, $\theta_P$, of the battered composite piles may be at least about 0 degrees to at most about 5 degrees different from the angle, $\theta_L$, of the angled legs of the tower. Because the array of battered composite piles have batter angles at angles that match the angle of the angled legs of the tower, the loads determined for the array of battered composite piles are in a higher axial load condition with a minor amount of shear load condition as compared to vertical foundations (e.g., vertical concrete shafts) having significant amounts of both a compression/lift load condition combined with a shear load condition.

Moreover, because the angled legs of the tower are attached in-line with the array of battered composite piles having batter angles at angles that substantially match the angle of the angled legs of the tower, the battered composite piles may be designed to handle the corresponding load of the local axis of each angled leg of the angled legs of the tower.

Designing the array of battered composite piles may include determining loads of a global axis for the tower (e.g., ground line reactions), resolving these loads on the tower to respective local axes of the angled legs of the tower, and determining a single vector (e.g., a representative loading vector) for each of the battered composite piles. For instance, designing the array of battered composite piles to be directly aligned with the angled legs of a tower may include analyzing each of multiple load cases on the tower to determine a controlling load case at each of the local axes of the angled legs of the tower and arrive at an optimal single vector associated with each of the battered composite piles to resist the combination of controlling loads at each of the angled legs of the tower. For instance, a worst case axial load and a worst case shear load may not occur under the same loading combination. The loading condition resulting in the maximum loading in the general direction of the battered tower leg will be derived and will establish the predominant loading vector for the composite pile. The selected controlling axial load and the selected controlling shear load combinations can then be resolved into a single vector representing a loading associated with each loading combination and applied to each of the battered composite piles to complete final design. Each of the battered composite piles may then be designed to be in-line with the predominant loading vector and to be an equal and opposite opposing force to the predominant loading vector. In this way, the array of battered composite piles, radially aligned with the tower, may then be designed to safely handle the respective load on each local axis of each angled leg of the tower. In these examples, where the analysis includes determining the loads of each local axis of each angled tower leg, the array of battered composite piles may be designed based at least in part on the determined predominantly axial loads of each local axis of each angled tower leg. Thus, the array of battered composite piles may be designed based on predominantly axial load conditions rather than shear load conditions.

Because the array of battered composite piles may be designed based on higher axial load (e.g., 1,200 kips) conditions and lower shear load (e.g., 10 kips) conditions of each local axis of each angled tower leg, the array of battered composite piles can be designed more efficiently and cost-effectively than vertical foundations (e.g., vertical concrete shafts) designed based on compression/lift load (e.g., 1,000 kips) conditions and shear load (e.g., 300 kips) conditions. For example, because the array of battered composite piles are in a higher axial load condition and a lower shear load condition, the battered composite piles can be designed to have a much smaller size (e.g., diameter) than vertical foundations in compression/lift load conditions and shear load conditions. Because the battered composite piles are much smaller than the vertical foundations, the battered composite piles can be installed in less time and at a lower cost than a time and cost of installing the vertical foundations.

The discussion begins with a section entitled "Example Battered Composite Piles," which describes details of the array of battered composite piles from FIG. 1. Next, a section entitled "Example Process for Designing and Installing an Array of Battered Composite Piles" illustrates and describes a process for creating custom designs (e.g., battered composite pile designs) based at least in part on an angle of legs of a specific tower. Finally, a brief conclusion ends the discussion.

This brief introduction, including section titles and corresponding summaries, is provided for the reader's convenience and is not intended to limit the scope of the claims, nor the proceeding sections.

Example Battered Composite Piles

FIG. 1 illustrates an example array of battered composite piles 102 attached to a tower 104. Here, for instance, the array of battered composite piles 102 may be attached to a plurality of angled tower legs 106(1), 106(2), 106(3) and 106(N) of the tower 104. While FIG. 1 illustrates the array of battered composite piles 102 attached to an electricity transmission tower, the array of battered composite piles 102 described herein may be attached to an observation tower, a radio tower, a windmill tower, or any other similar or different structure(s). Moreover, while FIG. 1 illustrates the tower 104 comprising a lattice tower, the tower may comprise a truss tower or any other similar or different freestanding framework tower. Further, while FIG. 1 illustrates the tower 104 as a four legged lattice tower, the tower 104 may comprise a three legged lattice tower, or any other quantity of legs. Of course, while FIG. 1 illustrates angled lattice members forming the tower 104, each lattice member of the tower 104 may comprise any shape or form in other implementations.

FIG. 1 illustrates the example array of battered composite piles 102 including battered composite piles 108(1), 108(2), 108(3) and 108(N) attached to the plurality of angled tower legs 106(1), 106(2), 106(3) and 106(N) of the tower 104 respectively. As illustrated, the array of battered composite piles 102 may have at least a same number of battered composite piles 108(1)-108(N) as a number of angled tower legs 106(1)-106(N) of the tower 104. In addition, FIG. 1 illustrates each battered composite pile 108(1)-108(N) may each have a batter angle ($\theta_1$) 110 designed to match an angle ($\theta_2$) 112 of the angled tower legs 106(1)-106(N) to which the array of battered composite piles 102 attach. For example, the angle 112 of the angled tower legs 106(1)-106(N) may comprise an angle of at least about 0 degrees and up to at most about 25 degrees, and the batter angle 110 may be designed to match the angle 112 of at least about 0 degrees and up to at most about 25 degrees.

FIG. 1 also illustrates a local axis 114 of each angled tower leg 106(1)-106(N) of the tower 104. For instance, at the time of designing the array of battered composite piles 102, an analysis may include determining loads of a global axis 116 for the tower 104, determining controlling loads of the local axis 114 of each angled tower leg 106(1)-106(N), and converting the controlling loads to a single vector (e.g., a representative loading vector) for each battered composite pile 108(1)-108(N). Both the global axis 116 having "X", "Y" and "Z" dimensions and the local axis 114 having "x", "y" and "z" dimensions may have two orthogonal components, generally an axial load and a shear load. The analysis may include determining the loads of the global axis 116 that are perpendicular and horizontal to a flat ground surface 118 below the tower 104. The loads of the global axis 116 may be published ground line reactions for the tower 104. The ground line reactions may include an axial load 120 at each angled tower leg 106(1)-106(N), a longitudinal shear load 122 at each angled tower leg 106(1)-106(N), and a transverse shear load 124 at each angled tower leg 106(1)-106(N). The axial load 120 may be substantially perpendicular to the flat ground surface 118, the longitudinal shear load 122 may be substantially horizontal to the flat ground surface 118 and parallel to at least a power line attached to the tower 104, and the transverse shear load 124 may be substantially horizontal to the ground surface 118 and at a right angle and/or at an obtuse angle to at least the power line attached to the tower 104.

The analysis may include determining the controlling loads of each local axis 114 of each angled tower leg 106(1)-106(N). For instance, a worst case axial load and a worst case shear load may be derived from each load case of the tower 104 and a controlling axial load and a controlling shear load can be selected from the determined worst case axial loads and determined worst case shear loads.

The analysis may include determining a single loading vector 126 with magnitude and orientation. For instance, the selected controlling axial load and the selected controlling shear load can be resolved into the single vector 126 for each local axis 114 of each angled tower leg 106(1)-106(N). The orientation of the single vector 126 may be an angle ($\theta_3$) 128 that may be at least about 0 degrees to at most about 5 degrees different from the angle, ($\theta_2$) 112 of each angled tower leg 106(1)-106(N). The batter angle ($\theta_1$) 110 of each battered composite pile 108(1)-108(N) may be designed to substantially match the angle ($\theta_3$) 128 of the single vector 126 that may be at least about 0 degrees to at most about 5 degrees different from the angle, ($\theta_2$) 112 of each angled tower leg 106(1)-106(N). In this way, each battered composite pile 108(1)-108(N) may each have the batter angle ($\theta_1$) 110 designed to match the angle ($\theta_2$) 112 of the angled tower legs 106(1)-106(N) to which the array of battered composite piles 102 attach. The local axis 114 of each angled tower leg 106(1)-106(N) may have angles that substantially match the angle 112 of the angled tower legs 106(1)-106(N).

The determining of the single vector 126 may include converting the selected controlling axial load (A) and the selected controlling shear load (S) to the single vector 126 (V) by calculating the following:

V Cosine $\theta_A$=A;
V Cosine $\theta_L$=$S_L$; and
V Cosine $\theta_T$=$S_T$.

The selected controlling axial load (A) having an angle $\theta_A$ (e.g., angle to ground line reaction) between a true vertical axis of the tower 104 and the single vector 126. The selected controlling shear load (S) including a longitudinal shear load ($S_L$) having an angle $\theta_L$ (e.g., angle to ground line reaction) between a longitudinal axis of the tower 104 and the single vector 126, and a transverse shear load ($S_T$) having an angle $\theta_T$ (e.g., angle to ground line reaction) between a transverse axis of the tower 104 and the single vector 126. The longitudinal axis of the tower 104 extending parallel to a power line attached to the tower 104, and the transverse axis of the tower 104 extending perpendicular to the power line attached to the tower 104. The overall magnitude of the single vector 126 representing the selected controlling axial load (A), the longitudinal shear load ($S_L$), and the transverse shear load ($S_T$) of the ground line reactions for the tower 104. And, the angle ($\theta_3$) 128 is specific to the true vertical axis of the tower, the longitudinal axis of the tower 104, and the transverse axis of the tower 104 so that when the single vector 126 is resolved over the true vertical axis, the longitudinal axis, and the transverse axis of the tower 104 the single vector 126 represents the ground line reactions of the tower 104.

The analysis may include resolving the single vector 126 on the local axis 114 of each angled tower leg 106(1)-106(N) of the tower 104 to determine a true axial load in each angled tower leg 106(1)-106(N) and a true shear load in each angled tower leg 106(1)-106(N). As discussed above, the angle ($\theta_3$) 128 of the single vector 126 may be different from the angle, $\theta_2$ 112 of each angled tower leg 106(1)-106(N) and this difference in geometry between the single vector 126 and the local axis 114 of each angled tower leg 106(1)-106(N) represents the true axial load in each angled tower leg 106(1)-106(N) and the true shear load in each angled tower leg 106(1)-106(N).

Resolving the single vector 126 (V) on the local axis 114 of each angled tower leg 106(1)-106(N) of the tower 104 may include calculating the following:

V Cosine $\theta_1$=$A_{TL}$; and

V Sine $\theta_1$=$S_{TL}$.

The angle ($\theta_1$) 110 can be equal to the difference in geometry between the single vector 126 and the local axis 114 of each angled tower leg 106(1)-106(N). For instance, the angle $\theta_1$ can be the difference between the angle ($\theta_3$) 128 of the single vector 126 and the angle, ($\theta_2$) 112 of an angled tower leg 106(1)-106(N). The difference between the angle ($\theta_3$) 128 of the single vector 126 and the angle, ($\theta_2$) 112 of an angled tower leg 106(1)-106(N) may be at least about 0 degrees to at most about 5 degrees. With this difference in geometry between the single vector 126 and the local axis 114 of each angled tower leg 106(1)-106(N), the true axial load ($A_{TL}$) in each angled tower leg 106(1)-106(N) and the true shear load ($S_{TL}$), combination of longitudinal and transverse shears, in each angled tower leg 106(1)-106(N) can be calculated. The true shear load ($S_{TL}$) can be used to determine an outside diameter of each of the battered composite piles 108(1)-108(N). For example, the shear load ($S_{TL}$) (e.g., the amount of flexure in the composite pile) can be used to determine an outside diameter of a casing used to form the battered composite piles 108(1)-108(N).

Finally, FIG. 1 illustrates a detail view 120 of the battered composite pile 108(N) connected to the angled tower leg 106(N) discussed in detail below with respect to FIG. 2.

Figure 2:
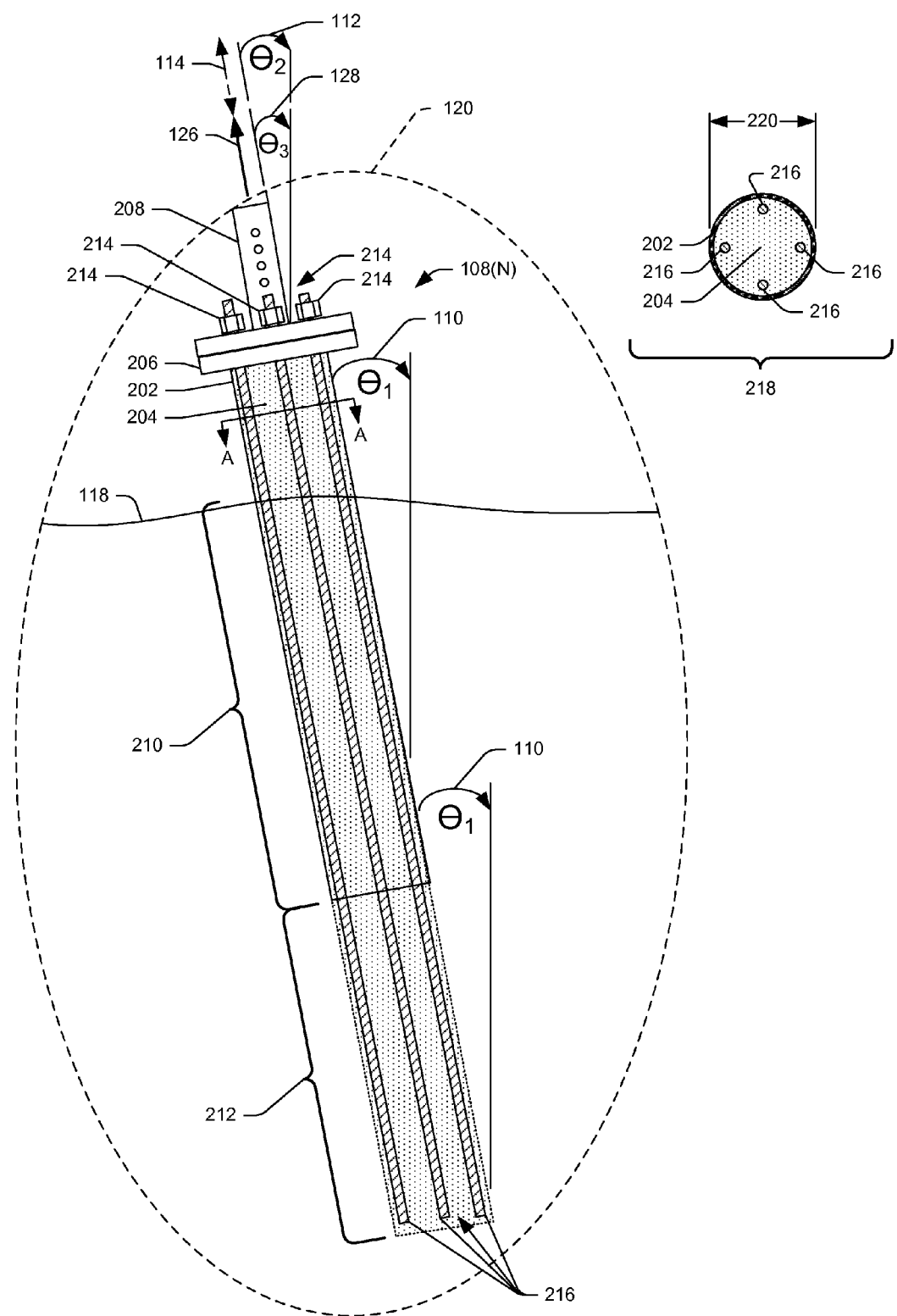
FIG. 2 illustrates an example detailed view of a battered composite pile of the array of battered composite piles attached to the tower illustrated in FIG. 1.

FIG. 2 illustrates the detail view 120 illustrated in FIG. 1. The detail view 120 illustrates each battered composite pile 108(1)-108(N) may comprise a casing 202, a cementitious mixture 204, a structural cap 206 and a mounting member 208. While FIG. 2 illustrates the mounting member 208 fixed to the structural cap, the mounting member 208 may not be fixed to the structural cap. For example, a portion the mounting member 208 may be arranged in the cementitious mixture 204 contained in the casing 202 rather than mounted to the structural cap 206. As illustrated, the casing 202 may comprise a substantially circular tube that is formed of metal (e.g., steel), composite, plastic, or any other suitable material. While FIG. 2 illustrates the casing comprising a substantially circular cross-section, the casing may comprise other curvilinear cross-sectional shapes or rectilinear cross-sectional shapes. For example, the casing may comprise a substantially ovular, rectangular, triangular, octagonal, hexagonal etc. The casing 202 may have a length 210 embedded in the ground equal to or greater than a minimum value. The minimum value may be based at least in part on load requirements of the battered composite piles and soil conditions. For instance, a minimum casing embedment length may be based at least in part on a number of battered composite piles and geotechnical conditions determined for a site (e.g., tower site). In one example, the length 210 of casing 202 to be embedded in the ground may be determined via a decision matrix (as described in U.S. patent application Ser. No. 12/797,945 incorporated herein by reference).

For example, a foundation pile schedule can illustrate details regarding a series of towers that are scheduled to be coupled to respective foundations. The foundation pile schedule can also include details regarding these foundations and a decision matrix for architecting the details of the foundation designs. Foundation details include, for instance, a projection of the pile group, various elevations of the pile group, an array diameter and batter angle of the pile group, as well as casing and rebar diameters. In addition, the details include a number of piles, a minimum casing embedment, a minimum bond length and a pile type. Each of these latter details may be dependent upon tower details, other pile design parameters and soil conditions at a point of characterization and below this point (as described with reference to process 1100 in U.S. patent application Ser. No. 12/797, 945). In an example, an operator may perform an in-situ penetration test to determine a geotechnical characteristic (e.g., an N-value) at each of one or more intervals within a pile location. With this information, the operator may consult the decision matrix mentioned above to determine a minimum casing embedment for the pile based at least in part on determined soil conditions for the number of piles determined. The casing embedment may be defined, in some instances, as the length of permanent casing that extends beyond a point of characterization.

The cementitious mixture 204 may be partly contained in the casing 202 as well as within a bond zone 212. The bond zone 212 may represent a length excavated in the ground equal to or greater than a minimum value. The minimum value of the bond zone may be based at least in part on load requirements of the battered composite piles and soil conditions. For instance, a minimum bond zone excavation length may be based at least in part on a number of battered composite piles and geotechnical conditions determined for a site (e.g., tower site). In one example, a length of the bond zone 212 may be determined via the decision matrix (as described in U.S. patent application Ser. No. 12/797,945 incorporated herein by reference). Again, the determination of the minimum bond length may be made with reference to interval N-values and the soil conditions associated therewith. For example, an operator may perform an in-situ penetration test to determine a geotechnical characteristic (e.g., an N-value) at each of one or more intervals within a pile location. With this information, the operator may consult the decision matrix mentioned above to determine a minimum bond length for the pile based at least in part on determined soil conditions for the number of piles determined. In contrast to the minimum casing length, the bond zone can consist of the minimum required bond length of a single continuous soil condition in some instances. Therefore, if the strata transitions in the bond zone, the total length of the bond zone may be extended to include the minimum required length of one continuous unit. The cementitious mixture 204 may be contained both within the casing and within a void (hole) underneath the casing.

FIG. 2 illustrates that the casing 202 may be embedded at the batter angle 110 that substantially matches the angle 112 of an angled tower leg 106(N). As discussed above, the angle 128 of the single vector 126 may be different from the angle 112 of each angled tower leg 106(1)-106(N). The batter angle 110 may be designed to substantially match the angle 128 of the single vector 126 that may be at least about 0 degrees to at most about 5 degrees different from the angle 112 of each angled tower leg 106(1)-106(N). In this way, the casing 202 may have the batter angle 110 designed to match the angle 112 of the angled tower legs 106(1)-106(N) to which the array of battered composite piles 102 attach. FIG. 2 further illustrates the cementitious mixture 204 contained in the bond zone 212 having the batter angle 110 that substantially matches the angle 112 of the angled tower leg 106(N). That is, these structural components of the composite pile 102 may have an axis that is in-line with the axis of the tower leg 106(N) to which it attaches.

Detail view 120 illustrates that the structural cap 206 may be attached to the casing 202. For example, the structural cap 206 may be welded to a top portion of the casing 202. In another example, the structural cap 206 may be bolted to the top of the casing 202. The structural cap 206 may comprise a substantially circular member formed of metal (e.g., steel), composite, plastic, or any other suitable material. The mounting member 208 may be attached to and protruding from the structural cap 206 substantially at a center of the structural cap 206. The mounting member 208 may have the batter angle 110 that substantially matches the angle 112 of the angled tower leg 106(N) and attach to the angled tower leg 106(N). In one example, the structural cap 206 may be attached to the casing 202 at an angle that is substantially perpendicular to the batter angle 110 that substantially matches the angle 112 of the angled tower leg 106(N). Further, the structural cap 206 may enable adjustment of a position of the mounting member 208 relative to the casing 202. For example, the structural cap 206 may enable the mounting member 208 to adjustable attach via fasteners 214 to a top surface of the structural cap 206.

As the reader will appreciate, the adjustability of the mounting member 208 allows an installer of the battered composite piles 108(1)-108(N) to adjust the mounting members 208 to more precisely fit a location of the angled tower legs 106(1)-106(N) of the tower 104 or other structural member to which the battered composite piles 108(1)-108(N) attaches.

Detail view 120 illustrates that each of the battered composite piles 108(1)-108(N) of the array of battered composite piles 102 may further comprise one or more reinforcing elements 216 (e.g., one or more threaded bars, deformed bars, composite bars, fiberglass bars, tendons, etc.). In one example, the multiple reinforcing elements 216 may receive the fasteners 214 to secure the mounting member 208 to the structural cap 206. Each of the multiple reinforcing elements 216 may have an angle that substantially matches the angle 112 of the angled tower leg 106(N). While detail view 120 illustrates the reinforcing elements 216 extending through the casing 202 and the bond zone 212 containing the cementitious mixture 204, the reinforcing elements 216 might not extend through the casing 202 and the bond zone 212 in some instances. For example, the reinforcing elements 216 may only extend a distance into the casing from the structural cap 206. In this example, where the reinforcing elements 216 do not extend through the casing 202, one or more other reinforcing elements may overlap the reinforcing elements 216 in the casing 202 and extend through casing 202 and the bond zone 212. Moreover, each of the other overlapping reinforcing elements may have an angle that substantially matches the angle 112 of the angled tower leg 106(N).

Further, while detail view 120 illustrates the reinforcing elements 216 arranged around the inside perimeter of the battered composite pile 108(N) (e.g., arranged around the inside diameter of the casing 202 and/or the bond zone 212), the reinforcing elements 216 may be distributed about at a center of the battered composite pile 108(N). For example, one or more reinforcing elements may be distributed about a center of the structural cap 206 and extend through the casing 202 and the bond zone 212 substantially at a center of the casing 202 and the bond zone 212. In this example where the one or more reinforcing elements are distributed substantially about the center of the structural cap 206 and extend through the battered composite pile 108(N) substantially at the center of the battered composite pile 108(N), the one or more reinforcing elements may have an angle that substantially matches the angle 112 of the angled tower leg 106(N). Moreover, and in this example where the one or more reinforcing elements are distributed substantially about the center of the structural cap 206 and extend through the battered composite pile 108(N) substantially at the center of the battered composite pile 108(N), one or more bolted fasteners may couple the mounting member 208 to the structural cap 206.

Detail view 120 illustrates a section A-A taken through a top portion of the battered composite pile 108(N). FIG. 2 illustrates a section view 218 of the battered composite pile 108(N) taken at the section A-A. Section view 218 illustrates the casing 202 of the battered composite pile 108(N) may have an outside diameter 220 of about 16 inches (41 centimeters). In one example, the outside diameter 220 may be at least about 6 inches (15 centimeters) to at most about 36 inches (91 centimeters). In other examples, the outside diameter may be smaller than 6 inches or bigger than 36 inches.

A designer (e.g., an engineer) may determine the outside diameter 220 (e.g., a minimum outside diameter) of the casing 202 based at least in part on the loads associated with the local axis 114 of the angled tower leg 106(N) to which the battered composite pile 108(N) attaches. For example, at the time of designing the array of battered composite piles 102, an analysis may include determining the loads of the local axis 114 of the angled tower leg 106(N) and determining the diameter 220 of the casing based at least in part on the loads of the local axis 114. In another example, the analysis may include determining the diameter 220 of the casing based at least in part on the batter angle 110 of the casing 202 and the bond zone 212 that substantially matches the angle 112 of the angled tower leg 106(N) of the tower 104. Further, the analysis may also include determining the diameter 220 of the casing based at least in part on the shear load ($S_{TL}$) (e.g., the amount of flexure in the composite pile), a resistance of geotechnical materials, and an unsupported length (e.g., reveal or foundation reveal) of the battered composite piles.

Figure 3:
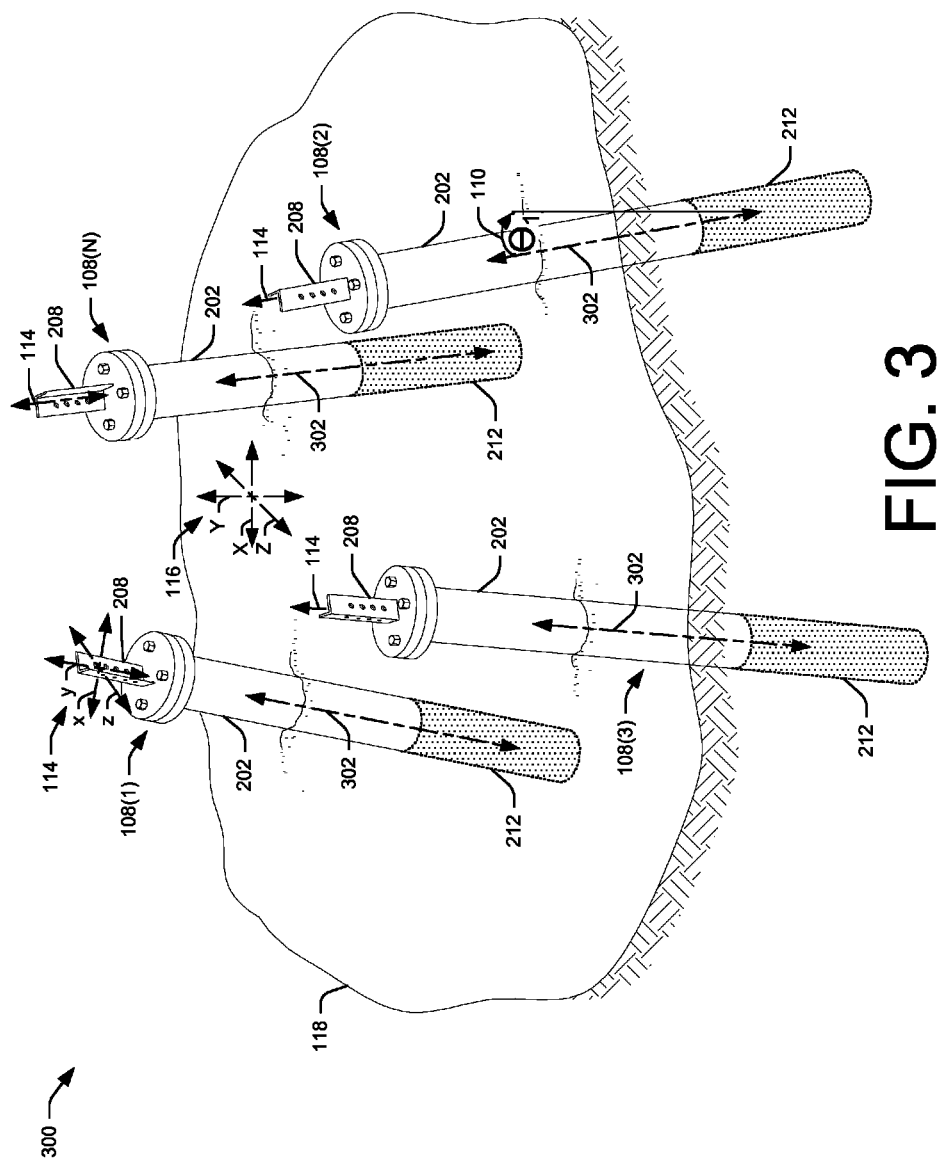
FIG. 3 illustrates a perspective view of the array of battered composite piles, illustrated in FIG. 1, without the tower attached to the array of battered composite piles.

FIG. 3 illustrates a perspective view 300 of the array of battered composite piles 102, illustrated in FIG. 1, without the tower 104 attached to the array of battered composite piles 102. FIG. 3 illustrates the global axis 116 of the tower 104 relative to the ground surface 118 and the local axis 114 of each of the angled tower legs 106(1)-106(N). The local axis 114 of each of the angled tower legs 106(1)-106(N) may be arranged in-line with a longitudinal axis 302 of each of the battered composite piles 108(1)-108(N). The longitudinal axis 302 of each of the battered composite piles 108(1)-108(N) may be along a center of each of the battered composite piles 108(1)-108(N). For example, each of the longitudinal axis 302 may be arranged substantially at a center of the casing 202 and the bond zone 212 and in-line with the local axis 114 of the tower leg. Thus, each of the longitudinal axis 302 may have the batter angle 110 designed to match an angle 112 of the angled tower legs 106(1)-106(N) to which the array of battered composite piles 102 attach.

As such, each of the battered composite piles 108(1)-108(N) of the array of battered composite piles 102 are designed to have the batter angle 110 to match the angle 112 of the angled tower legs 106(1)-106(N) which provides for a predominantly axial loaded condition of the battered composite piles 108(1)-108(N) rather than a predominantly shear load condition found in traditional vertical concrete shafts. Because the battered composite piles 108(1)-108(N) are predominantly axial loaded rather than predominantly shear loaded, the battered composite piles 108(1)-108(N) require lesser volume of materials than compared with traditional vertical concrete shafts. Hence, the array of battered composite piles 102 requires far less cementitious mixture than traditional vertical concrete shafts, as is the required labor to install the array of battered composite piles 102. This lesser cementitious mixture and lesser labor enables an installer of a tower to more quickly and cost-effectively complete a foundation for a tower.

Figure 4:
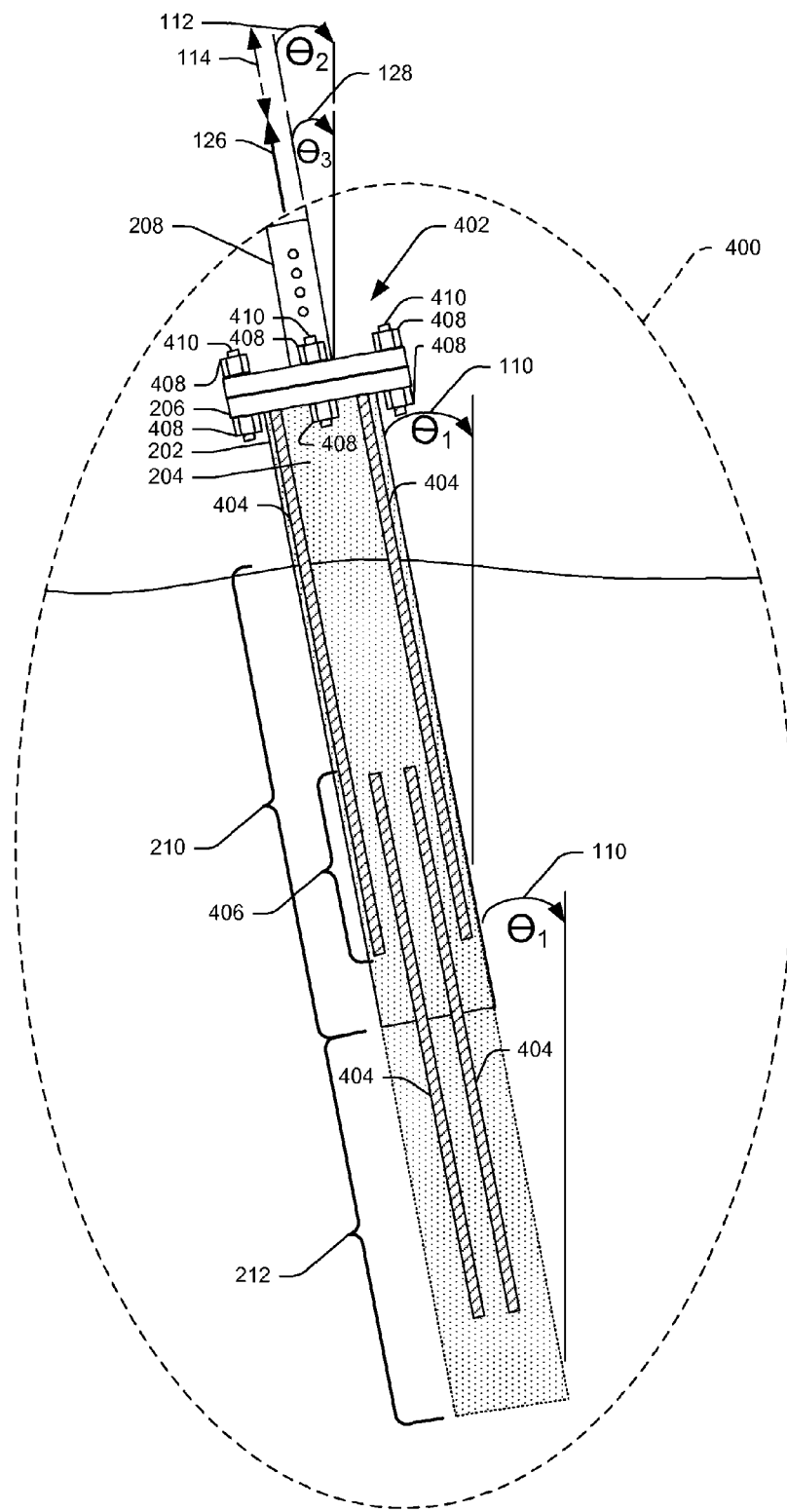
FIG. 4 illustrates an example detailed view of another example battered composite pile comprising overlapping reinforcing elements.

FIG. 4 illustrates a detail 400 of another example battered composite pile 402 comprising some of the same features as the battered composite piles 108(1)-108(N) illustrated in FIGS. 1-3. For example, the battered composite pile 402 is illustrated as comprising the casing 202, the cementitious mixture 204, the structural cap 206 and the mounting member 208. Here in this example embodiment, the battered composite pile 402 is illustrated as comprising overlapping reinforcing elements 404. FIG. 4 illustrates some of the reinforcing elements may be attached to a bottom portion of the structural cap 206 and extend into the casing 202, and some of the reinforcing elements 404 are not attached to the structural cap 206 and extend from the casing 202 into the bond zone 212. While FIG. 4 illustrates some of the reinforcing elements 404 attached to the bottom of portion of the structural cap 206, the reinforcing elements 404 may extend through the structural cap 206 to receive fasteners. FIG. 4 illustrates the reinforcing elements 404 attached (e.g., threaded, welded, pinned, etc.) to the structural cap 206 overlapping 406 the reinforcing elements 404 not attached to the structural cap 206. The overlapping 406 reinforcing elements 404 having the batter angle 110 that substantially matches the angle 112 of the angled tower legs 106(1)-106(N).

FIG. 4 illustrates the mounting member 208 secured to the structural cap 206 via fasteners 408 received by reinforcing elements 410 arranged on an outside perimeter of the structural cap 206.

Figure 5:
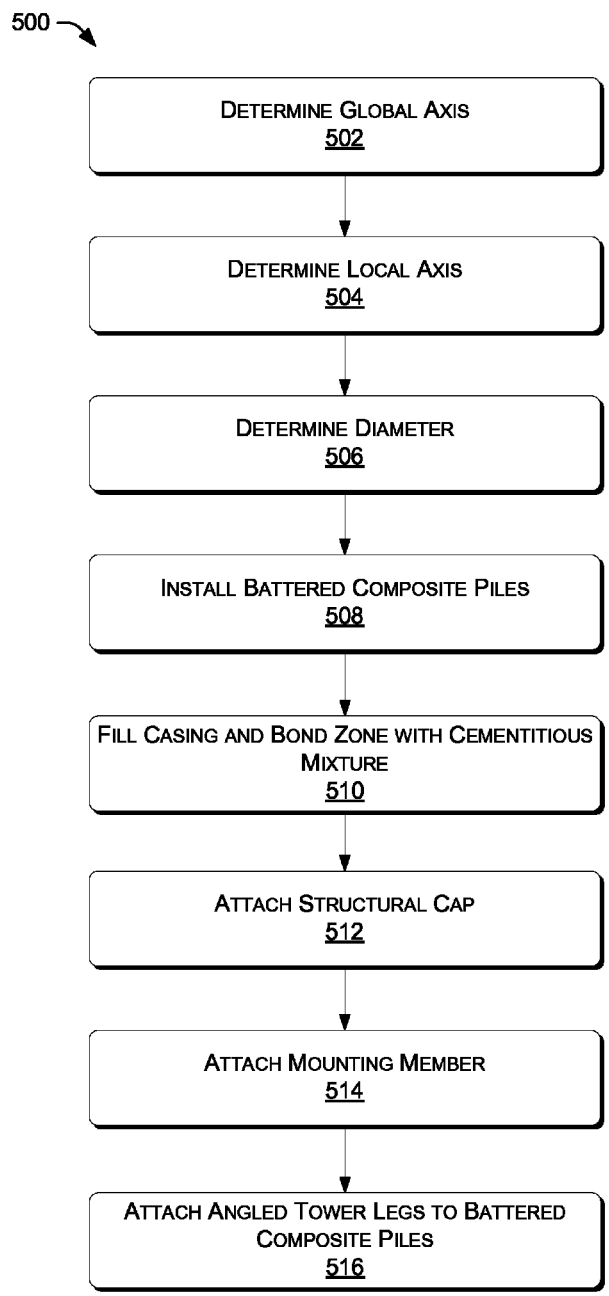
FIG. 5 illustrates an example process for designing and installing an array of battered composite piles whose batter angles substantially match angles of respective tower legs of a tower.

Example Process for Designing and Installing an Array of Battered Composite Piles FIG. 5 illustrates an example process for designing and installing an array of battered composite piles (e.g., array of battered composite piles 102) to a tower (e.g., tower 104) or other structure. In some instances, this process designs battered composite piles to have a batter angle that matches an angle of a plurality of angled tower legs, as illustrated and described above. In addition, these battered composite piles may comprise both a casing and a bond zone that may be configured to receive a cementitious mixture.

Process 500 may include determining, at operation 502, a global axis (e.g., global axis 116) of the tower. For example, a designer may determine a global axis for the tower and the loads of the global axis that are perpendicular and horizontal loads of the global axis of the tower relative to a flat ground surface (e.g., ground surface 118) below the tower.

Process 500 may include determining, at operation 504, a local axis (e.g., local axis 114) of each angled leg of a tower and the loads along each local axis of each angled tower leg of the tower. That is, the designer may resolve the load along the global axis amongst each tower leg, defining respective loads along the local axis of each tower leg.

Next, process 500 may continue with operation 506 which represents determining a diameter of the battered composite piles based at least in part on the batter angle of the battered composite piles that substantially matches the angle of the plurality of angled tower legs. In one example, operation 506 may include determining the outside diameter of the casing based at least in part on loads associated with the local axis of the angled tower legs to which the battered composite piles attach. Operation 506 may also include determining the outside diameter of the casing based at least in part on the shear load ($S_{TL}$) (e.g., the amount of flexure in the composite pile), a resistance of geotechnical materials, and an unsupported length (e.g., reveal or foundation reveal) of the battered composite piles.

Process 500 may include operation 508 which represents installing the battered composite piles having the batter angle that matches the angle of a plurality of angled tower legs. For instance, operation 508 represents installing the casing and the bond zone of the battered composite piles at the determined batter angle. For example, an operator may install the casing and bond zone via an apparatus (e.g., a drill) for excavating angled shafts. For example, an operator may drill a hole along the proposed local axis of the angled tower leg and embed the casing to the determined embedment length above the bond zone. For example, an operator may embed casing at an angle that substantially matches an angle of a respective angled tower leg and excavate a bond zone at the angle that substantially matches the angle of the angled tower leg. Operation 508 may include inserting a plurality of reinforcing elements into the casing and/or the bond zone at the batter angle of the battered composite piles that substantially matches the angle of the plurality of angled tower legs.

Operation 508 may be followed by operation 510. Operation 510 represents filling the casing and the bond zone with a cementitious mixture, such as concrete or the like.

At operation 512, a structural cap may be attached to the casing. For instance, the structural cap may be attached to the casing at an angle that is substantially perpendicular to the batter angle of the battered composite piles. The structural cap may be a composite cap (e.g., a steel and concrete cap), a steel cap, a concrete cap, etc. In some examples, operation 512 may be omitted. For example, a structural cap may not be attached to the casing.

Process 500 may include operation 514 which represents attaching a mounting member to the structural cap 206. For instance, the mounting member may be attached to and protruding from the structural cap substantially at a center of the structural cap. Operation 514 may include adjusting a position of the mounting member relative to the casing. For example, an installer of the mounting member may adjust the mounting member to more precisely fit a location of the angled tower legs of the tower to which the battered composite piles attach. Operation 514 may include securing the mounting member to the structural cap via fasteners received by the reinforcing elements.

At operation 516, an operator may attach the angled tower legs to the battered composite piles. For example, an operator may attach the angled tower legs to the mounting members attached to the structural caps. The operator may attach the angled tower legs to the mounting members before or after the cementitious mixture cures. In the example where operation 512 is omitted and a structural cap is not attached to the casing, operation 514 may represent embedding a mounting member in the cementitious mixture before the mixture cures. In this example where a mounting member is embedded in the mixture, after allowing the mixture to cure at operation 516, an operator may attach the angled tower legs to the mounting members embedded in the mixture.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims. For example, the various embodiments described herein may be rearranged, modified, and/or combined. As another example, one or more of the method acts may be performed in different orders, combined, and/or omitted entirely, depending on the battered composite piles to be produced.

We claim:

1. A foundation for anchoring a plurality of angled tower legs of a tower, the foundation comprising:
   multiple battered composite piles, each of the multiple battered composite piles configured to attach to a respective angled tower leg and comprising:
      a casing embedded at an angle that substantially matches an angle of the respective angled tower leg;
      a cementitious mixture contained in a bond zone excavated underneath the casing at the angle that substantially matches the angle of the angled tower leg;
      a structural cap attached to the casing, wherein
         the structural cap is attached to the casing at an angle that is substantially perpendicular to the angle that substantially matches the angle of the respective angled tower leg, and
         the structural cap enables adjustment of a position of a mounting member relative to the casing, wherein the structural cap includes a first portion including the mounting member and a second portion that is attached to the casing, the first portion moveable relative to the second portion;
      the mounting member attached to and protruding from the first portion of the structural cap at the angle that substantially matches the angle of the respective angled tower leg, the mounting member configured to attach to the respective angled tower leg; and
      multiple reinforcing elements to receive fasteners to secure the mounting member to the structural cap, the multiple reinforcing elements residing at least partly within the casing at the angle that substantially matches the angle of the respective angled tower leg, and arranged around an inside perimeter of the battered composite pile.

2. The foundation as recited in claim 1, wherein the multiple reinforcing elements comprise threaded bars, deformed bars, composite bars, fiberglass bars or tendons.

3. The foundation as recited in claim 1, wherein the angle of the respective angled tower leg comprises an angle of at least about 0 degrees and up to at most about 25 degrees.

4. The foundation as recited in claim 1, wherein the casing comprises an outside diameter of at least about 6 inches (15 centimeters) to at most about 36 inches (91 centimeters).

5. A foundation for anchoring angled legs of a tower, the foundation comprising:
   a first battered composite structural member for anchoring a first angled leg of the tower, the first battered composite structural member comprising:
      a first casing embedded at an angle that substantially matches an angle of the first angled leg of the tower;
      a cementitious mixture contained in a first bond zone excavated underneath the first casing at the angle that substantially matches the angle of the first angled leg of the tower;
      a first structural cap attached to the first casing at an angle that is substantially perpendicular to the angle that substantially matches the angle of the first angled tower leg; and
      multiple first reinforcing elements to receive fasteners to secure a first mounting member to the first structural cap, each of the multiple first reinforcing elements residing at least partly within the first casing at the angle that substantially matches the angle of the first angled leg of the tower, and arranged around an inside perimeter of the first battered composite structural member;
   a second battered composite structural member for anchoring a second angled leg of the tower, the second battered composite structural member comprising:
      a second casing embedded at an angle that substantially matches an angle of the second angled leg of the tower;
      a cementitious mixture contained in a second bond zone excavated underneath the second casing at the angle that substantially matches the angle of the second angled leg of the tower;
      a second structural cap attached to the second casing at an angle that is substantially perpendicular to the angle that substantially matches the angle of the second angled tower leg; and
      multiple second reinforcing elements to receive fasteners to secure a second mounting member to the second structural cap, each of the multiple reinforcing elements residing at least partly within the second casing at the angle that substantially matches the angle of the second angled leg of the tower, and arranged around an inside perimeter of the second battered composite structural member; and
   a third battered composite structural member for anchoring a third angled leg of the tower, the third composite structural member comprising:
      a third casing embedded at an angle that substantially matches an angle of the third angled leg of the tower;
      a cementitious mixture contained in a third bond zone excavated underneath the third casing at the angle that substantially matches the angle of the third angled leg of the tower;
      a third structural cap attached to the third casing at an angle that is substantially perpendicular to the angle that substantially matches the angle of the third angled tower leg; and
      multiple third reinforcing elements to receive fasteners to secure a third mounting member to the third structural cap, each of the multiple reinforcing elements residing at least partly within the third casing at the angle that substantially matches the angle of the third angled leg of the tower, and arranged around an inside perimeter of the third battered composite structural member.

6. The foundation as recited in claim 5, wherein each of the first, second and third mounting members protrude from each of the first, second and third structural caps at the angle that substantially matches the angle of the respective angled tower leg.

7. The foundation as recited in claim 6, wherein each of the first, second, and third structural caps enables adjustment of a position of the respective first, second, and third mounting members relative to the respective first, second, and third casings.

8. The foundation as recited in claim 5, wherein the angle of each of the first, second, and third angled tower legs comprises an angle of at least about 0 degrees and up to at most about 25 degrees.

9. The foundation as recited in claim 5, wherein the first casing of the first battered composite structural member has a diameter different than a diameter of the second casing of the second battered composite structural member or a diameter of the third casing of the third battered composite structural member, and the first bond zone of the first battered composite structural member has a length different than a length of the second bond zone of the second battered composite structural member or a length of the third bond zone of the third battered composite structural member.

10. The foundation as recited in claim 5, wherein:
the first structural cap includes a first portion including the first mounting member and a second portion that is attached to the first casing, the first portion moveable relative to the second portion;
the second structural cap includes a third portion including the second mounting member and a fourth portion that is attached to the second casing, the third portion moveable relative to the fourth portion; and
the third structural cap includes a fifth portion including the third mounting member and a sixth portion that is attached to the third casing, the fifth portion moveable relative to the sixth portion.

11. A method of installing a foundation for anchoring a plurality of angled tower legs, the method comprising:
for each of multiple battered composite piles to be attached to a respective angled tower leg,
determining a diameter of a casing to be embedded based at least in part on an angle of the respective angled tower leg and a length of a bond zone to be excavated underneath the casing;
excavating the bond zone at an angle that substantially matches the angle of the respective angled tower leg;
embedding, above the bond zone, the casing at the angle that substantially matches the angle of the respective angled tower leg;
arranging around an inside perimeter of the respective battered composite pile multiple reinforcing elements, the multiple reinforcing elements residing at least partly within the casing at the angle that substantially matches the angle of the respective angled tower leg, and the multiple reinforcing elements to receive fasteners to secure a mounting member to a structural cap;
attaching the structural cap to the casing at an angle that is substantially perpendicular to the angle that substantially matches the angle of the respective angled tower leg; and
adjusting a position of the mounting member relative to the casing.

12. The method as recited in claim 11, further comprising filling the casing and the bond zone with a cementitious mixture.

13. The method as recited in claim 12, further comprising attaching the respective angled tower leg to the mounting member after the cementitious mixture cures.

14. The method as recited in claim 11, further comprising:
determining a minimum length of the casing embedment; and
determining a minimum length of the bond zone.

* * * * *